United States Patent
Kroon et al.

(10) Patent No.: US 10,982,629 B2
(45) Date of Patent: Apr. 20, 2021

(54) VEHICLE INTAKE AIR HEATER

(71) Applicant: Volvo Car Corporation, Gothenburg (SE)

(72) Inventors: Peter Kroon, Gothenburg (SE); Anders Petrén, Marstrand (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 16/261,673

(22) Filed: Jan. 30, 2019

(65) Prior Publication Data
US 2020/0240375 A1    Jul. 30, 2020

(51) Int. Cl.
| F02M 31/00 | (2006.01) |
| F02M 35/10 | (2006.01) |
| F02M 26/17 | (2016.01) |
| F02M 26/30 | (2016.01) |
| F02D 41/00 | (2006.01) |
| B01D 46/00 | (2006.01) |

(Continued)

(52) U.S. Cl.
CPC ... F02M 35/10268 (2013.01); B01D 46/0002 (2013.01); B01D 46/4263 (2013.01); F02D 41/0002 (2013.01); F02M 26/07 (2016.02); F02M 26/17 (2016.02); F02M 26/30 (2016.02); F02M 35/024 (2013.01); F02M 35/10222 (2013.01); B01D 2279/60 (2013.01)

(58) Field of Classification Search
CPC ............. F02M 35/10268; F02M 26/17; F02M 35/024; F02M 26/05; F02M 31/042; F02M 26/07; B01D 46/4263; B01D 2279/60
See application file for complete search history.

(56) References Cited

U.S. PATENT DOCUMENTS

| 1,347,043 A | * | 7/1920 | Justice | F01P 9/04 123/41.48 |
| 4,020,815 A | | 5/1977 | Hubert | |

(Continued)

FOREIGN PATENT DOCUMENTS

| DE | 102009034581 A1 | * | 2/2010 | ............. F02M 35/02 |
| DE | 102018218883 A1 | * | 5/2020 | ............. F02M 26/32 |

OTHER PUBLICATIONS

DE-102009034581 A1 English translation.*
DE 102018218883 English Translation (Year: 2020).*

*Primary Examiner* — George C Jin
*Assistant Examiner* — Teuta B Holbrook
(74) *Attorney, Agent, or Firm* — Clements Bernard Walker; Christopher L. Bernard

(57) ABSTRACT

An intake air filter box utilizing an intake air heater that inhibits the buildup of snow and ice within the intake air filter box, keeping the associated flow passages clear such that pressure loss is not adversely affected. This intake air heater can include an electric heater or a radiant heater coupled to the exhaust gas recirculation (EGR) system of the vehicle, or to another source of heated fluid. Preferably, the intake air heater is disposed on the "dirty" side of the filter disposed within the intake air filter box, adjacent to the intake air conduit and air intake of the vehicle. This is where the snow and ice accumulation occurs. A drain is provided in the bottom of the intake air filter box housing to allow the escape of water from the melted snow and ice, ensuring that this moisture is not delivered to the turbocharger and engine with the intake air.

15 Claims, 3 Drawing Sheets

(51) Int. Cl.
   *B01D 46/42* (2006.01)
   *F02M 26/07* (2016.01)
   *F02M 35/024* (2006.01)

(56) References Cited

U.S. PATENT DOCUMENTS

| | | | | |
|---|---|---|---|---|
| 4,122,679 | A * | 10/1978 | Charron | F02B 29/0406 60/599 |
| 4,204,848 | A * | 5/1980 | Schulmeister | F02B 29/0406 123/563 |
| 4,683,858 | A * | 8/1987 | Sato | F02D 41/187 123/486 |
| 4,754,742 | A | 7/1988 | Young | |
| 4,944,260 | A | 7/1990 | Shea et al. | |
| 5,871,001 | A * | 2/1999 | Pelkey | F01P 3/12 123/198 E |
| 6,029,363 | A | 2/2000 | Kiel | |
| 6,047,676 | A * | 4/2000 | Trapy | F02N 19/10 123/142.5 R |
| 6,257,211 | B1 * | 7/2001 | Vela, Jr. | F02M 35/042 123/542 |
| 6,301,887 | B1 * | 10/2001 | Gorel | F01N 3/0222 123/563 |
| 6,409,784 | B1 * | 6/2002 | Wehr | B01D 46/0002 123/198 E |
| 7,284,508 | B2 | 10/2007 | Dopke et al. | |
| 7,475,657 | B2 | 1/2009 | Dopke et al. | |
| 7,658,183 | B1 * | 2/2010 | Johnson | F02B 29/0443 123/540 |
| 7,757,674 | B2 | 7/2010 | Dopke et al. | |
| 7,963,832 | B2 | 7/2011 | Bellinger | |
| 8,042,326 | B2 | 10/2011 | Farell et al. | |
| 9,499,043 | B2 | 11/2016 | Zocher et al. | |
| 9,850,858 | B2 | 12/2017 | Mouton et al. | |
| 2004/0149240 | A1 * | 8/2004 | Wettergard | F02M 25/028 123/25 A |
| 2006/0075988 | A1 * | 4/2006 | Howe | F02M 35/04 123/198 E |
| 2008/0190109 | A1 * | 8/2008 | Kardos | F02M 26/24 60/605.2 |
| 2008/0276913 | A1 * | 11/2008 | Zubeck | B60K 6/442 123/543 |
| 2010/0186354 | A1 * | 7/2010 | Braithwaite | B01D 46/0039 55/385.3 |
| 2011/0000469 | A1 * | 1/2011 | Lauberts | F02B 29/0493 123/564 |
| 2014/0158099 | A1 * | 6/2014 | Asmis | F02M 26/05 123/568.15 |
| 2020/0141366 | A1 * | 5/2020 | Quix | F02M 26/32 |

* cited by examiner

VEHICLE INTAKE AIR HEATER

TECHNICAL FIELD

The present invention relates generally to the automotive field. More specifically, the present invention relates to an intake air heater operable for controlling the buildup of snow and ice in the intake air filter box of a vehicle such that pressure loss is not adversely affected prior to the associated turbocharger and internal combustion (IC) engine. This intake air heater is especially applicable when an exhaust gas recirculation (EGR) system is utilized, preferentially requiring warm intake air.

BACKGROUND ART

In cold climates and under cold conditions, the buildup of snow and ice in the intake air filter box of a vehicle can be a problem. Such intake air filter boxes are typically coupled via an intake air conduit to an air intake that is open to the surrounding environment. The buildup of snow and ice in the intake air filter box can block flow passages therein, which are typically protected by restrictor structures, and adversely affect pressure loss. This can degrade turbocharger and engine performance. Clear flow passages provide enhanced turbocharger performance and greater engine power. This can be especially pronounced in vehicles incorporating an exhaust gas recirculation (EGR) system, which preferentially requires warm intake air to operate properly in cold climates and under cold conditions.

As fuel efficiency and emissions concerns become increasingly important, more and more vehicles are being equipped with turbochargers utilizing EGR systems. EGR systems increase the fuel efficiency of an internal combustion (IC) engine and reduce the emissions of noxious exhaust gases by recirculating a portion of the unused fuel and exhaust gases back to the engine for subsequent use, instead of releasing them into the environment. In a low pressure (LP) EGR system, the exhaust gases are reintroduced to the engine just upstream of the turbocharger compressor, at the turbocharger compressor inlet. At this location, the pressure is low, even under high engine boost conditions. This solves some of the quality issues associated with related high pressure (HP) EGR systems.

EGR gases are mixed with conventional intake air just before entering the turbocharger compressor. The ratio of EGR gases to intake air determines the efficiency of the EGR system and engine overall. The utilization of EGR gases, however, is often limited by the condensation of water droplets in the EGR gases near the mixing point as the hot, humid EGR gases are cooled by the cool, dry intake air. This cooling usually occurs through (and condensation usually occurs on and adjacent to) the wall that divides the hot, humid EGR gases from the cool, dry intake air just prior to the mixing point, in the hot, humid EGR gases. This problem is especially pronounced under cold start and low temperature operating conditions, sometimes delaying the normal activation of the EGR system. This can compromise emissions testing results, for example, and otherwise degrade engine performance. In a worst case scenario, under extreme conditions, ice particles can even be formed in the EGR gases, exacerbating these issues.

Problematically, the condensed water droplets (or ice particles) near the mixing point of the EGR gases and the intake air are fed directly to the turbocharger compressor. These water droplets (or ice particles) can impact the turbocharger compressor wheel, blades, and other components, damaging them. The water droplets initially exert a force perpendicular to the component surface, which causes a blast wave upon component surface contact, resulting in a force exerted parallel to the component surface. This force exerted parallel to the component surface can impinge upon surface imperfections, causing spalls, cracks, etc. at or near such surface imperfections.

Warm intake air is often preferred to inhibit the condensation of water droplets and the formation of ice particles near the mixing point of the EGR gases and intake air, and especially on and adjacent to the wall separating the EGR gases from the intake air, such that the subsequent turbocharger compressor wheel, blades, and other components are not damaged by the condensed water droplets or formed ice particles.

Thus, what is needed in the art is an intake air filter box that inhibits the accumulation of snow and ice therein, keeping the associated flow passages clear, and that provides warm intake air under predetermined vehicle operating conditions, optimizing EGR system performance.

SUMMARY

Accordingly, the intake air filter box provided herein utilizes an intake air heater that inhibits the buildup of snow and ice within the intake air filter box, keeping the associated flow passages clear such that pressure loss is not adversely affected. This intake air heater can include an electric heater or a radiant heater coupled to the exhaust gas recirculation (EGR) system of the vehicle, or to another source of heated fluid. Preferably, the intake air heater is disposed on the "dirty" side of the filter disposed within the intake air filter box, adjacent to the intake air conduit and air intake of the vehicle. This is where the snow and ice accumulation occurs. A drain is provided in the bottom of the intake air filter box housing to allow the escape of water from the melted snow and ice, ensuring that this moisture is not delivered to the turbocharger and engine with the intake air.

In the event that the intake air heater is coupled to the EGR system of the vehicle, it can also be used to selectively heat the cool, dry intake air prior to the mixing point with the hot, humid EGR gases. This intake air heater utilizes available heat from a high pressure (HP) EGR heat exchanger, circulating a heating fluid between the HP EGR heat exchanger and the intake air heater. The intake air heater includes a heat exchanger conduit section disposed within the intake air filter box that is thermally contacted with the intake air.

The selective operation of the intake air heater, regardless of type, is controlled via an electronic control module (ECM) of the vehicle, based on the vehicle operating conditions and, optionally, an appropriate temperature control model. In the event that the intake air heater is coupled to the EGR system of the vehicle, the flow of the heating fluid is selectively enabled/disabled by a pump and/or valve assembly disposed along the associated high temperature (HT) heating circuit.

Thus, the intake air heater provided herein effectively inhibits snow and ice accumulation in the intake air filter box, as well as the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic vehicle operating conditions.

In one exemplary embodiment, the intake air filter box assembly provided herein includes: a filter housing adapted to contain an intake air filter disposed between an inlet side of the filter housing and an outlet side of the filter housing; an intake air inlet port coupled to the inlet side of the filter housing and adapted to receive intake air from an air intake of the vehicle; an intake air outlet port coupled to an outlet side of the filter housing and adapted to deliver the intake air to one or more of a turbocharger and an engine of the vehicle; and an intake air heater disposed within the filter housing and adapted to selectively melt one or more of snow and ice present in the filter housing and heat the intake air.

In another exemplary embodiment, the intake air heater assembly provided herein includes: one of an electrical resistance heating element and a radiant heating conduit adapted to be disposed within a filter housing adapted to contain an intake air filter disposed between an inlet side of the filter housing and an outlet side of the filter housing; wherein the one of the electrical resistance heating element and the radiant heating conduit is adapted to selectively melt one or more of snow and ice present in the filter housing and heat intake air passed through the filter housing.

In a further exemplary embodiment, the computer program product provided herein includes a non-transitory computer readable medium having instructions stored thereon and executed to cause a computer to: receive an operating state of a vehicle; compare the operating state of the vehicle to a temperature control model; and, based on the comparison of the operating state of the vehicle to the temperature control model, selectively enable/disable operation of an intake air heater of a vehicle and heating of intake air between an air intake and a turbocharger compressor of the vehicle.

BRIEF DESCRIPTION OF THE DRAWINGS

The intake air filter box and intake air heater provided herein are illustrated and described herein with reference to the various drawings, in which like reference numbers are used to denote like assembly components/method steps, as appropriate, and in which.

DESCRIPTION OF EMBODIMENTS

Again, the intake air filter box provided herein utilizes an intake air heater that inhibits the buildup of snow and ice within the intake air filter box, keeping the associated flow passages clear such that pressure loss is not adversely affected. This intake air heater can include an electric heater or a radiant heater coupled to the exhaust gas recirculation (EGR) system of the vehicle, or to another source of heated fluid. Preferably, the intake air heater is disposed on the "dirty" side of the filter disposed within the intake air filter box, adjacent to the intake air conduit and air intake of the vehicle. This is where the snow and ice accumulation occurs. A drain is provided in the bottom of the intake air filter box housing to allow the escape of water from the melted snow and ice, ensuring that this moisture is not delivered to the subsequent turbocharger and engine with the intake air.

In the event that the intake air heater is coupled to the EGR system of the vehicle, it can also be used to selectively heat the cool, dry intake air prior to the mixing point with the hot, humid EGR gases. This intake air heater utilizes available heat from a high pressure (HP) EGR heat exchanger, circulating a heating fluid between the HP EGR heat exchanger and the intake air heater. The intake air heater includes a heat exchanger conduit section disposed within the intake air filter box that is thermally contacted with the intake air.

The selective operation of the intake air heater, regardless of type, is controlled via an electronic control module (ECM) of the vehicle, based on the vehicle operating conditions and, optionally, an appropriate temperature control model. In the event that the intake air heater is coupled to the EGR system of the vehicle, the flow of the heating fluid is selectively enabled/disabled by a pump and/or valve assembly disposed along the associated high temperature (HT) heating circuit.

Thus, the intake air heater provided herein effectively inhibits snow and ice accumulation in the intake air filter box, as well as the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic vehicle operating conditions.

Figure 1:
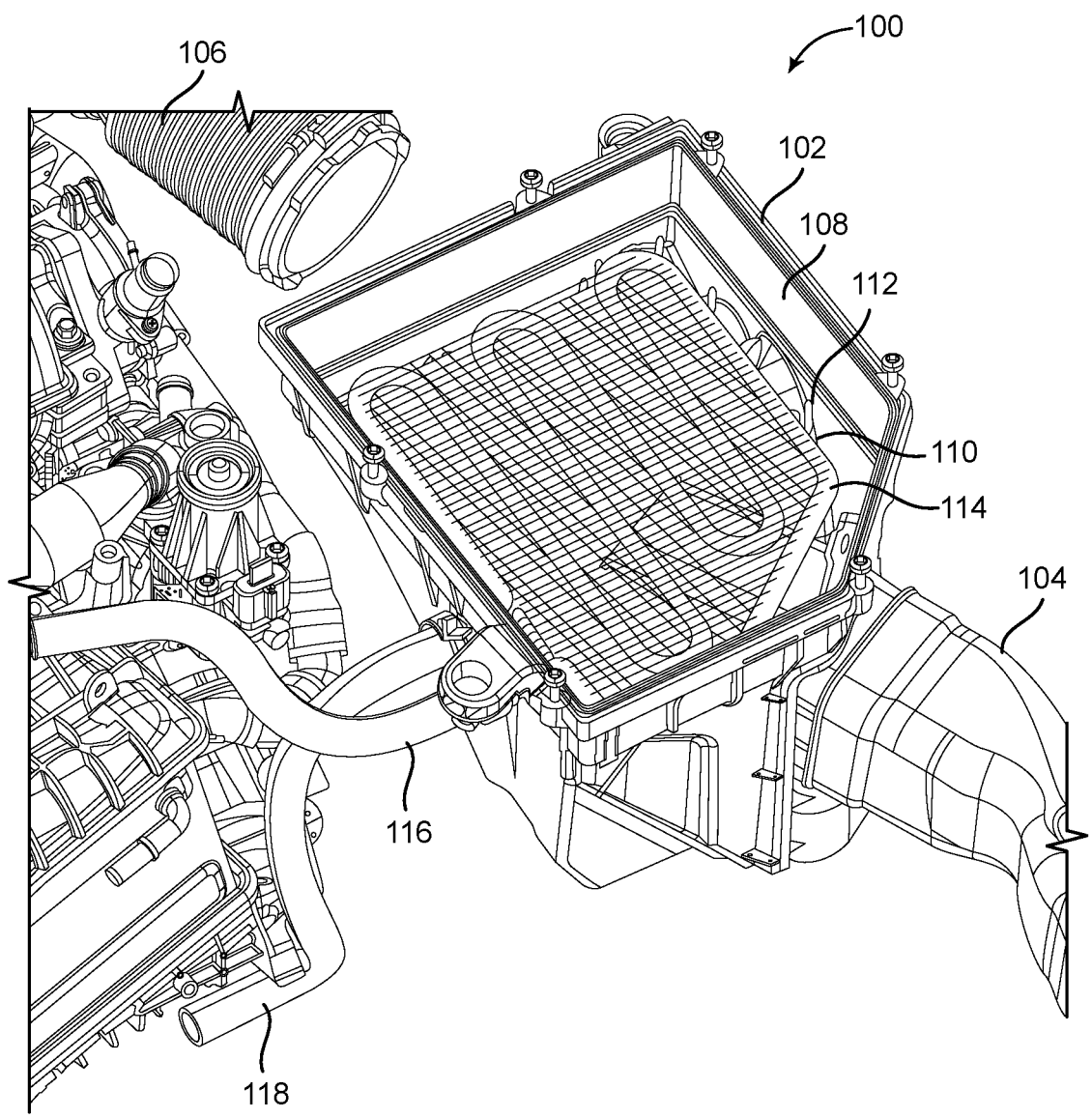
FIG. 1 is a perspective view of one exemplary embodiment of the intake air filter box and intake air heater provided herein, with the intake air filter box being in an open or uncovered configuration.

Referring now specifically to FIG. 1, in one exemplary embodiment, the intake air filter box 100 provided herein includes a filter housing 102 including an intake air inlet port 104 from the air intake (not illustrated) and an intake air outlet port 106 to the turbocharger compressor, turbocharger, and engine (not illustrated), via which intake air is communicated from the air intake to the turbocharger compressor, turbocharger, and engine. The filter housing 102 includes a shelf structure 108 on which a filter (not illustrated) is selectively disposed. The filter divides the filter housing 102 into a "dirty" side adjacent to the intake air inlet port 104 and a "clean" side adjacent to the intake air outlet port 106. In this respect, the filter housing 102 provides a relatively air-tight box that houses the filter.

The intake air heater 110 is also disposed within the filter housing 102, preferably on the "dirty" side of the filter, where snow and ice accumulation can occur. The intake air heater 110 can include an electrical (i.e., resistance) heating element 112 coupled to an appropriate power source (not illustrated) or a radiant heating conduit 114 coupled to an appropriate heating fluid source, described in greater detail herein below. In the case that the radiant heating conduit 114 is used, the heating conduit 114 is preferably made of a thermally conductive material, such as a metallic material, that is capable of efficiently conducting heat from the heating fluid to the surrounding snow, ice, and intake air. In either case, the heating element 112 or heating conduit 114 preferably takes a circuitous path through the filter housing 102, such that the thermally-conductive surface area is maximized.

In the case that the radiant heating conduit 114 is used, the heating conduit 114 is fluidly coupled to an inlet line 116 from the heating fluid source and an outlet line 118 to the heating fluid source. The heating fluid source can be a HP EGR heat exchanger (not illustrated) that forms a portion of the EGR system (not illustrated) of the vehicle, as described in greater detail herein below.

Figure 2:
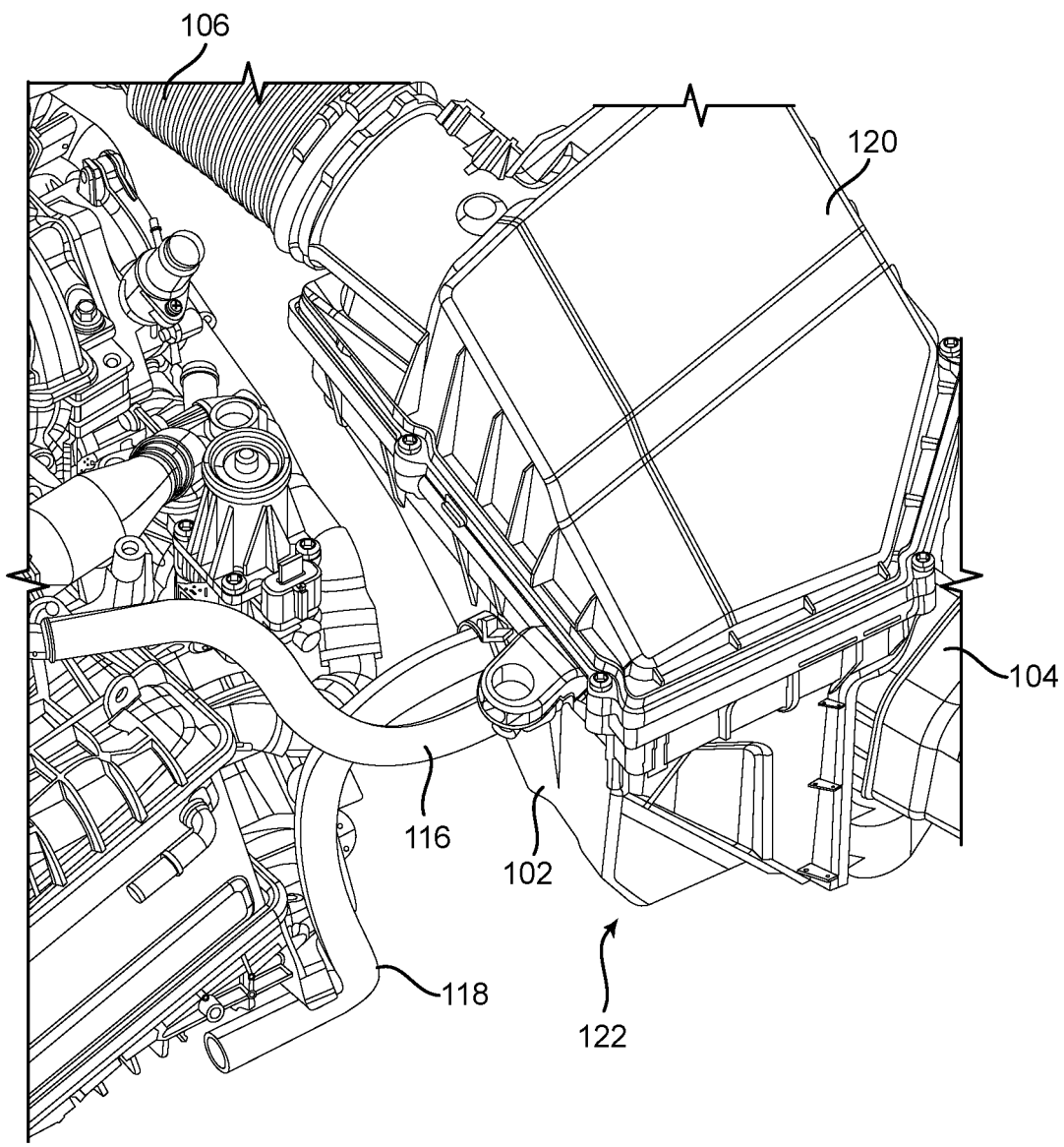
FIG. 2 is another perspective view of one exemplary embodiment of the intake air filter box and intake air heater provided herein, with the intake air filter box being in a closed or covered configuration.

FIG. 2 is a perspective view of the intake air filter box 100 with the intake air filter box 100 being in a closed or covered configuration via the use of a filter housing cover 120 coupled to the filter housing 102, with the filter (not illustrated) disposed therein. The inlet line 116 and outlet line 118 protrude through a side portion of the filter housing 102. Preferably, the filter housing 102 and filter housing cover 120 at least partially thermally insulate the heating element 112 or heating conduit 114 of the intake air heater 110 (FIG. 1). Again, the filter housing 102 and filter housing cover 120 provide a relatively air-tight box that houses the filter. Accordingly, the filter housing cover 120 is bolted, latched, or otherwise secured to the filter housing 102, optionally with a sealing gasket (not illustrated) or the like disposed therebetween. A drain 122 is provided in the bottom of the filter housing 102 to allow the escape of water from the melted snow and ice, ensuring that this moisture is not delivered to the subsequent turbocharger and engine with the intake air.

Figure 3:
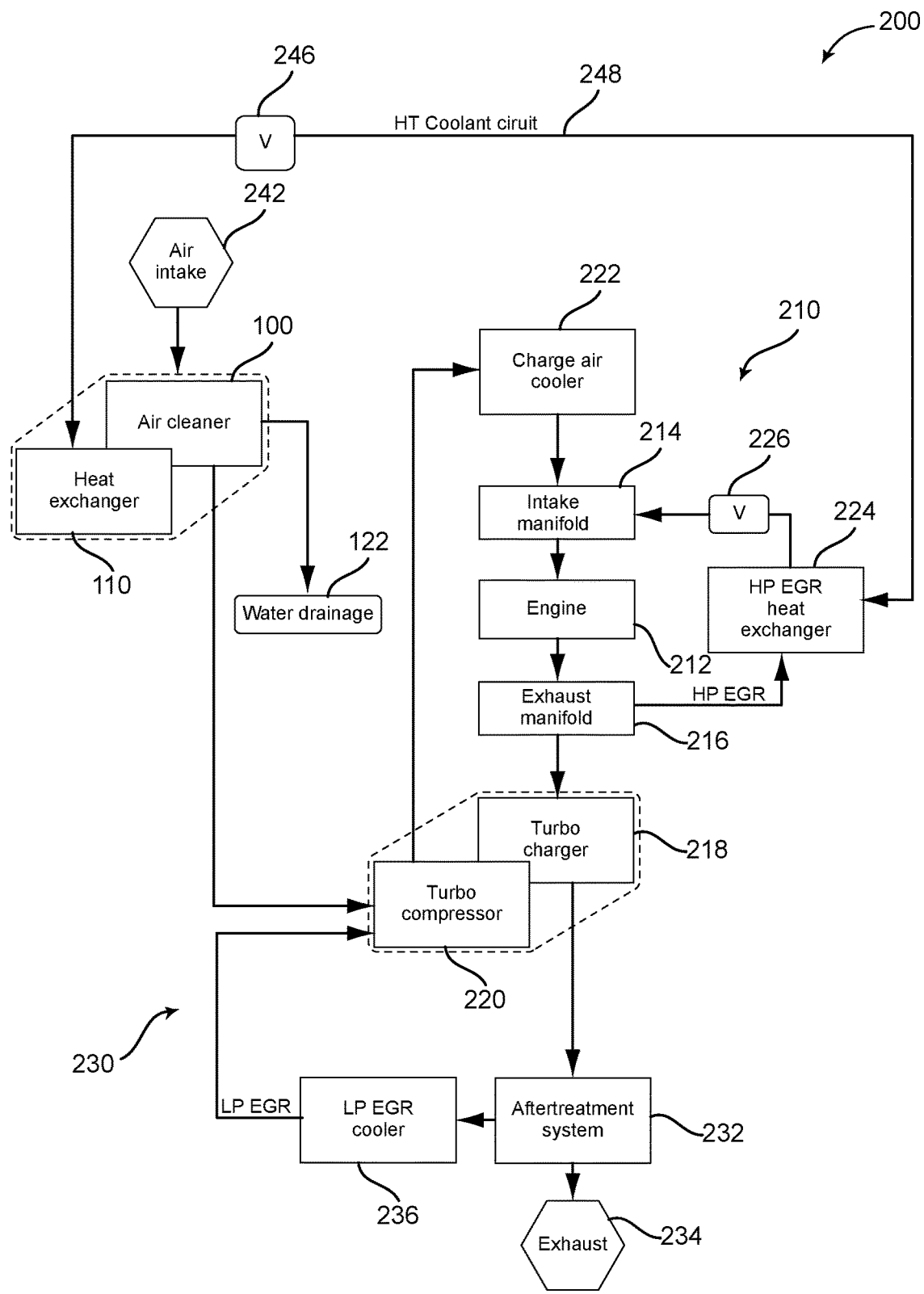
FIG. 3 is a schematic diagram illustrating one exemplary embodiment of the EGR system provided herein, utilizing the intake air heater of FIGS. 1 and 2.

Referring now specifically to FIG. 3, in the case that the radiant heating conduit 114 (FIG. 1) is used, the EGR system 200 provided herein includes the following components, most of which are conventional and are thus not described in greater detail herein. The EGR system 200 includes a HP EGR circuit 210 including the engine 212 of the vehicle incorporating both an intake manifold 214 and an exhaust manifold 216. The turbocharger 218 is coupled to the exhaust manifold 216 and includes an appropriate turbocharger compressor 220 that mixes and compresses the intake air addressed herein and the EGR gases from the exhaust manifold 216. The turbocharger compressor 220 outlets to a charge air cooler 222 that is coupled to the intake manifold 214. The HP EGR circuit 210 is formed by the HP EGR heat exchanger 224 disposed between the exhaust manifold 216 and the intake manifold 214, along with an appropriate pump and/or valve assembly 226 operable for selectively enabling/disabling the flow of coolant through the HP EGR circuit 210.

The EGR system 200 also includes a low pressure (LP) EGR circuit 230 including an after-treatment system 232 coupled to the turbocharger 218 and, ultimately, the vehicle exhaust 234. ALP EGR cooler 236 is coupled between the after-treatment system 232 and the turbocharger compressor 220.

The EGR system 200 further includes the air cleaner, or intake air filter box 100, coupled to the air intake 242 of the vehicle. The intake air filter box 100 is generally configured to provide the cool, dry intake air to the turbocharger compressor 220, proximate to which the cool, dry intake air is mixed with the hot, humid EGR gases. As provided herein, the "dirty" side of the filter (not illustrated) disposed within the intake air filter box 100 includes the intake air heater 110 that is fluidly coupled to the HP EGR heat exchanger 224 of the HP EGR circuit 210. This intake air heater 110 is operable for selectively melting snow and ice that accumulates in the intake air filter box 100, as well as heating the cool, dry intake air, thereby limiting condensation proximate the turbocharger compressor 220 when the cool, dry intake air is mixed with the hot, humid EGR gases. In this embodiment, the operation of the intake air heater 110 is controlled by a pump and/or valve assembly 246 disposed along the HT coolant circuit 248, and ultimately by the vehicle ECM (not illustrated). Again, a water drain 122 or the like is provided in the lower portion of the intake air filter box 100 to selectively remove water/condensation from the intake air filter box 100 when the snow and ice are melted, ensuring that this moisture is not delivered to the subsequent turbocharger 218 and engine 212 with the intake air.

Again, the intake air heater 110 effectively inhibits snow and ice accumulation in the intake air filter box 100, as well as the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic vehicle operating conditions.

The software algorithm contemplated herein determines the current and desired operating state of the associated vehicle and enables/disables the operation of the intake air heater 110 as appropriate, in accordance with the description herein. Preferably, the software algorithm is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, sensors, etc., as described herein.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc.

configured to provide end user functionality. The programs can include an application or "app" which provides various functionalities.

Again, the intake air heater provided herein effectively inhibits snow and ice accumulation in the intake air filter box, as well as the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic vehicle operating conditions.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

The invention claimed is:

1. An intake air filter box assembly for use in a vehicle, the intake air filter box assembly comprising:
    a filter housing adapted to contain an intake air filter disposed between an inlet side of the filter housing and an outlet side of the filter housing;
    an intake air inlet port coupled to the inlet side of the filter housing and adapted to receive intake air from an air intake of the vehicle;
    an intake air outlet port coupled to an outlet side of the filter housing and adapted to deliver the intake air to one or more of a turbocharger and an engine of the vehicle; and
    an intake air heater disposed within the filter housing and adapted to melt snow and ice present in the filter housing and heat the intake air, wherein an operation temperature of the intake air heater is controlled by an electronic control module (ECM) of the vehicle and selected to melt the snow and ice present in the filter housing and heat the intake air to a degree that prevents condensation of water droplets and formation of ice particles near a mixing point of exhaust gas recirculation (EGR) gases and the intake air in an upstream proximity of a compressor inlet of the vehicle;
    wherein the intake air heater comprises a radiant heater adapted to circulate a heating fluid obtained from a high-pressure (HP) EGR heat exchanger of an EGR system of the vehicle, wherein the HP EGR heat exchanger of the EGR system is coupled between an exhaust manifold and an intake manifold of the engine of the vehicle and the heating fluid is heated via an associated exhaust flow through the HP EGR heat exchanger controlled by an adjacent valve assembly.

2. The intake air filter box assembly of claim 1, wherein the intake air heater is disposed on the inlet side of the filter housing.

3. The intake air filter box assembly of claim 1, further comprising a filter housing cover adapted to be selectively and sealing coupled to the filter housing.

4. The intake air filter box assembly of claim 1, wherein the intake air heater further comprises an electrical resistance heater.

5. The intake air filter box assembly of claim 1, wherein the radiant heater comprises a radiant heating conduit disposed within the filter housing and fluidly coupled to an inlet heating fluid line and an outlet heating fluid line, both disposed through the filter housing, wherein the inlet heating fluid line and the outlet heating fluid line are both fluidly coupled to the HP EGR heat exchanger of the EGR system.

6. The intake air filter box assembly of claim 5, wherein one or more of the inlet heating fluid line and the outlet heating fluid line are fluidly coupled to one or more of a pump assembly and a valve assembly adapted to selectively enable/disable a flow of heating fluid through the one or more of the inlet heating fluid line and the outlet heating fluid line.

7. The intake air filter box assembly of claim 1, wherein the filter housing comprises a drain mechanism disposed in a bottom portion thereof and adapted to allow the release of water from the filter housing.

8. An intake air heater assembly for use in a vehicle, the intake air heater assembly comprising:
    an electrical resistance heating element and a radiant heating conduit adapted to be disposed within a filter housing adapted to contain an intake air filter disposed between an inlet side of the filter housing and an outlet side of the filter housing;
    wherein the electrical resistance heating element and the radiant heating conduit are adapted to melt snow and ice present in the filter housing and heat intake air passed through the filter housing, wherein an operation temperature of the electrical resistance heating element and the radiant heating conduit is controlled by an electronic control module (ECM) of the vehicle and selected to melt the snow and ice present in the filter housing and heat the intake air passed through the filter housing to a degree that prevents condensation of water droplets and formation of ice particles near a mixing point of exhaust gas recirculation (EGR) gases and the intake air in an upstream proximity of a compressor inlet of the vehicle;
    wherein the radiant heating conduit is adapted to circulate a heating fluid obtained from a high-pressure (HP) EGR heat exchanger of an EGR system of the vehicle, wherein the HP EGR heat exchanger of the EGR system is coupled between an exhaust manifold and an intake manifold of an engine of the vehicle and the heating fluid is heated via an associated exhaust flow through the HP EGR heat exchanger controlled by an adjacent valve assembly.

9. The intake air heater assembly of claim 8, wherein the intake air heater is adapted to be disposed on the inlet side of the filter housing.

10. The intake air heater assembly of claim 8, wherein the radiant heating conduit is fluidly coupled to an inlet heating fluid line and an outlet heating fluid line, both adapted to be disposed through the filter housing, wherein the inlet heating fluid line and the outlet heating fluid line are both adapted to be fluidly coupled to the HP EGR heat exchanger of the EGR system.

11. The intake air heater assembly of claim 10, wherein one or more of the inlet heating fluid line and the outlet heating fluid line are adapted to be fluidly coupled to one or more of a pump assembly and a valve assembly adapted to selectively enable/disable a flow of heating fluid through the one or more of the inlet heating fluid line and the outlet heating fluid line.

12. A computer program product comprising a non-transitory computer readable medium having instructions stored thereon and executed to cause a computer to:
    receive an operating state of a vehicle;

compare the operating state of the vehicle to a temperature control model; and based on the comparison of the operating state of the vehicle to the temperature control model, selectively enable/disable operation of an intake air heater of a vehicle and heating of intake air between an air intake and a turbocharger compressor of the vehicle;

wherein the computer comprises an electronic control module (ECM) of the vehicle and an operation temperature of the intake air heater is selected to melt snow and ice present in a filter housing of the vehicle and heat the intake air to a degree that prevents condensation of water droplets and formation of ice particles near a mixing point of exhaust gas recirculation (EGR) gases and the intake air in an upstream proximity of a compressor inlet of the vehicle;

wherein the intake air heater comprises a radiant heater adapted to circulate a heating fluid obtained from a high-pressure (HP) EGR heat exchanger of an EGR system of the vehicle, wherein the HP EGR heat exchanger of the EGR system is coupled between an exhaust manifold and an intake manifold of an engine of the vehicle and the heating fluid is heated via an associated exhaust flow through the HP EGR heat exchanger controlled by an adjacent valve assembly.

13. The computer program product of claim 12, wherein selectively enabling/disabling the operation of the intake air heater further comprises selectively enabling/disabling operation of an electrical resistance element of the intake air heater.

14. The computer program product of claim 13, wherein the electrical resistance element of the intake air heater is disposed within a filter housing of the vehicle on an intake air side thereof.

15. The computer program product of claim 12, wherein a radiant heating conduit of the intake air heater is disposed within a filter housing of the vehicle on an intake air side thereof.

* * * * *